(12) United States Patent
Bal et al.

(10) Patent No.: US 12,436,740 B2
(45) Date of Patent: Oct. 7, 2025

(54) HIGH THROUGHPUT LINEAR FEEDBACK SHIFT REGISTER

(71) Applicant: STMicroelectronics International N.V., Geneva (CH)

(72) Inventors: Ankur Bal, Greater Noida (IN); Abhishek Kishore Kaul, Himachal Pradesh (IN); Jeet Narayan Tiwari, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 1092 days.

(21) Appl. No.: 17/393,492

(22) Filed: Aug. 4, 2021

(65) Prior Publication Data

US 2022/0066498 A1   Mar. 3, 2022

Related U.S. Application Data

(60) Provisional application No. 63/072,376, filed on Aug. 31, 2020.

(51) Int. Cl.
    *G06F 7/58* (2006.01)
(52) U.S. Cl.
    CPC .................................. *G06F 7/584* (2013.01)
(58) Field of Classification Search
    CPC ............................................... G06F 7/58–588
    See application file for complete search history.

(56) References Cited

U.S. PATENT DOCUMENTS

| | | | |
|---|---|---|---|
| 5,974,433 A * | 10/1999 | Currie | G06F 7/584 708/252 |
| 5,991,909 A | 11/1999 | Rajski et al. | |
| 7,613,757 B1 * | 11/2009 | Abbaszadeh | G06F 1/025 708/250 |
| 2006/0133468 A1 | 6/2006 | Chen et al. | |
| 2011/0187400 A1 | 8/2011 | Watanabe | |
| 2011/0299569 A1 | 12/2011 | Baba | |
| 2011/0299581 A1 | 12/2011 | Le-Gall | |
| 2011/0302471 A1 | 12/2011 | Le-Gall | |

(Continued)

FOREIGN PATENT DOCUMENTS

CN            103098018 A       5/2013

OTHER PUBLICATIONS

First Office Action and Search Report for counterpart CN Appl. No. 202111005174.3, report dated Jun. 28, 2024, 13 pgs.

*Primary Examiner* — Matthew D Sandifer
(74) *Attorney, Agent, or Firm* — Crowe & Dunlevy LLC (57) ABSTRACT

An N-bit linear feedback shift register includes P parallel chains of flip flops each having an input and output. The input is coupled to output of an XOR circuit for that parallel chain. Inputs of the XOR circuit for that parallel chain are coupled to outputs of different flip flops of the P parallel chains according to exponents of a primitive polynomial of order N−1. The flip flops of the P parallel chains of flip flops are clocked by a second clock. At each rising edge of the second clock, P LFSR pre-outputs are respectively produced from the outputs of last flip flops of each of P parallel chains of flip flops. Readout circuitry clocked by a first clock having a frequency that is P times that of the first clock passes a different one of the P pre-LFSR outputs at each clock cycle as a LFSR output.

23 Claims, 6 Drawing Sheets

(56) References Cited

U.S. PATENT DOCUMENTS

2015/0268933 A1* 9/2015 Rivoir .................. H03K 3/84
                                                        708/250
2018/0246701 A1* 8/2018 Kawai .................. G06F 7/584
2018/0337707 A1   11/2018 Hirschmann et al.

* cited by examiner

In this Example:
P=4
N=24
x=0 to P-1
y=0 to LeastInteger[(N-1-X)/P]

FIG. 6 ized design for a LFSR capable of high throughput.
HIGH THROUGHPUT LINEAR FEEDBACK SHIFT REGISTER

RELATED APPLICATION

This application claims priority to United States Provisional Application for Patent No. 63/072,376, filed Aug. 31, 2020, the contents of which are incorporated by reference in their entirety to the maximum extent allowable under the law.

TECHNICAL FIELD

This disclosure is related to the field of linear feedback shift registers (LFSRs) and, in particular, is related to a parallelized design for a LFSR capable of high throughput.

BACKGROUND

A liner feedback shift register (LFSR) is a shift register whose input bit is a linear function of its previous state. This input bit is typically generated as an exclusive OR of bits from certain taps of the LFSR. The operation of a LFSR is deterministic, since the stream of values produced thereby is determined by its current or previous states. Since the LFSR has a finite number of possible states, it eventually enters a repeating cycle. However, since LFSRs include a feedback function, they may produce a sequence of bits that appears random, and has a very long repeating cycle. Therefore, LFSRs are widely used in applications to generate pseudo-random numbers.

Figure 1:
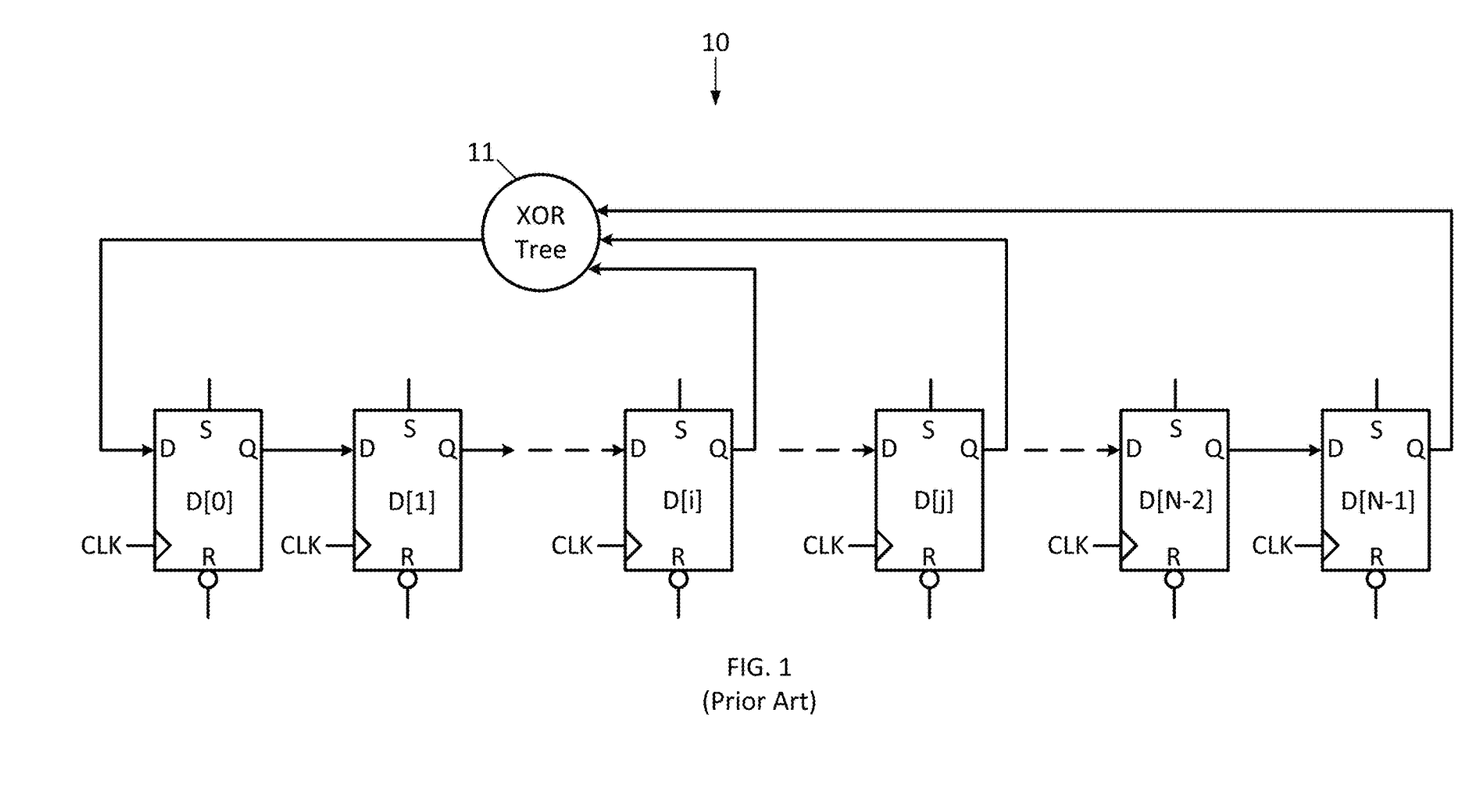
FIG. 1 is a block diagram of a prior art linear feedback shift register (LFSR).

A typical LFSR 10 is shown in FIG. 1, and is formed as a chain of flip flops synchronously clocked by a clock signal CLK. Here, the LFSR 10 is an N-bit LFSR, so there are N flip flops, labeled as being from D [0] to D [N−1]. The flip flop D [0] receives input from an exclusive OR tree 11, and provides output to the subsequent flip flop D [1] in the chain, which in turn provides output to the next flip flop in the chain, and so on until the last flip flop D [N−1] in the chain receives input from the previous flip flop D [N−2].

A primitive polynomial function (the generation of which is known to those of skill in the art) of order N−1 (this N being the same N as the number of bits of the LFSR) is used to determine the inputs to the XOR tree 11. In particular, the outputs of the flip flops corresponding to the exponents of the primitive polynomial function become the inputs to the XOR tree 11. In the illustrated example, the exponents of the primitive polynomial function of order N are i, j, and N−1. Therefore, as illustrated, the inputs to the XOR tree 11 are the outputs of the flip flops D [i], D [j], and D [N−1].

LFSRs 10 such as the design illustrated in FIG. 1 are quite useful and are in wide usage. However, such LFSRs 10 encounter issues when it is desired to operate them at high speed (i.e., with a clock CLK having a high frequency) despite the fact they are formed in slower technologies. In particular, the individual flip flops are limited by setup time, limiting the speed at which such LFSRs 10 can operate when implemented in certain technologies.

Therefore, a need remains for LFSRs 10 that can operate at high speed, even when implemented in slower technologies.

SUMMARY

Disclosed herein is an N-bit linear feedback shift register (LFSR) including: a number P of parallel chains of flip flops each having an output; a counter clocked by a fast clock and configured to output N different output words, with a different one of the N different output words being produced at each pulse of the fast clock, and configured to reset once each of the N different output words has been output; a multiplexer having a singular output, having inputs coupled to the outputs of the P parallel chains of flip flops, having a selection input coupled to the counter, and configured to pass a different input to the singular output dependent upon which of the N different output words is received from the counter; and a flip flop having an input coupled to the singular output of the multiplexer and being clocked by the fast clock such that the flip flop passes a current state of its input to its output upon each pulse of the fast clock.

Each parallel chain of flip flops is formed by: a chain of flip flops clocked by a slow clock, the slow clock being equal to the fast clock divided by P, each flip flop of that chain except a last flip flop of that chain having an index calculated as x+yP, where x represents which of the P parallel chains of flip flops that the chain of flip flops belongs to, and where y represents a position within the chain of flip flops occupied by that flip flop, wherein the last flip flop of that chain has an index calculated as x+yP where y is equal to a smallest integer greater than or equal to (N−1−x)/P; and an exclusive-OR (XOR) circuit for that parallel chain of flips receiving, as input, output from those flip flops of the chain of flip flops for that parallel chain of flip flops having an index equal to an exponent of a primitive polynomial of order N−1, wherein the XOR circuit for that parallel chain of flip flops provides its output as input to a first of the chain of flip flops for that parallel chain of flip flops.

Also disclosed herein is an N-bit linear feedback shift register (LFSR), including: a number P of parallel chains of flip flops each having an input and an output, wherein the input is coupled to an output of a combinational logic circuit for that parallel chain of flip flops, wherein inputs of the combinational logic circuit for that parallel chain of flip flops are coupled to outputs of different flip flops of the P parallel chains of flip flops according to exponents of a primitive polynomial of order N−1, wherein the flip flops of the P parallel chains of flip flops are clocked by a second clock; wherein, at each rising edge of the second clock, P LFSR outputs are respectively produced from the outputs of last flip flops of each of P parallel chains of flip flops.

A controller may be configured to, in a startup mode, reset all but one flip flop of each of the parallel chains of flip flops, but set the one flip flop of each of the parallel chains of flip flops that was not reset.

A multiplexer may have a singular output, and have inputs coupled to the outputs of the P parallel chains of flip flops, and configured to pass a different input to the singular output dependent upon which of N different output words is received at a selection input of the multiplexer.

A flip flop may have an input coupled to the singular output of the multiplexer and being clocked by a first clock such that the flip flop passes a current state of its input to its output upon each pulse of the first clock, wherein the first clock has a frequency that is P times a frequency of the second clock.

A counter may be clocked by a first clock and configured to output the N different output words, with a different one of the N different output words being produced at each pulse of the first clock, and configured to reset once each of the N different output words has been output. The combinational logic circuit may be an exclusive-OR (XOR) circuit.

Also disclosed herein is an N-bit linear feedback shift register (LFSR), including: a number P of parallel chains of flip flops each having an output; a counter clocked by a first clock and configured to output N different output words, with a different one of the N different output words being produced at each pulse of the first clock, and configured to reset once each of the N different output words has been output; a multiplexer having a singular output, and having inputs coupled to the outputs of the P parallel chains of flip flops, having a selection input coupled to the counter to receive the N different output words from the counter, and configured to pass a different input to the singular output dependent upon which of the N different output words is received from the counter; and a flip flop having an input coupled to the singular output of the multiplexer and being clocked by the first clock such that the flip flop passes a current state of its input to its output upon each pulse of the first clock. Each parallel chain of flip flops includes: a chain of flip flops clocked by a second clock, the second clock being equal to the first clock divided by P; and a combinational logic circuit for that parallel chain of flip flops receiving, as input, output from selected flip flops of the chains of flip flops of others of the P parallel chains of flip flops, wherein the combinational logic circuit for that parallel chain of flip flops provides its output as input to a first of the chain of flip flops for that parallel chain of flip flops.

The combinational logic circuit may be an exclusive-OR (XOR) circuit.

A controller may be configured to, in a startup mode, reset all but one flip flop of each of the parallel chains of flip flops, and set the but one flip flop of each of the parallel chains of flip flops that was not reset.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 2:
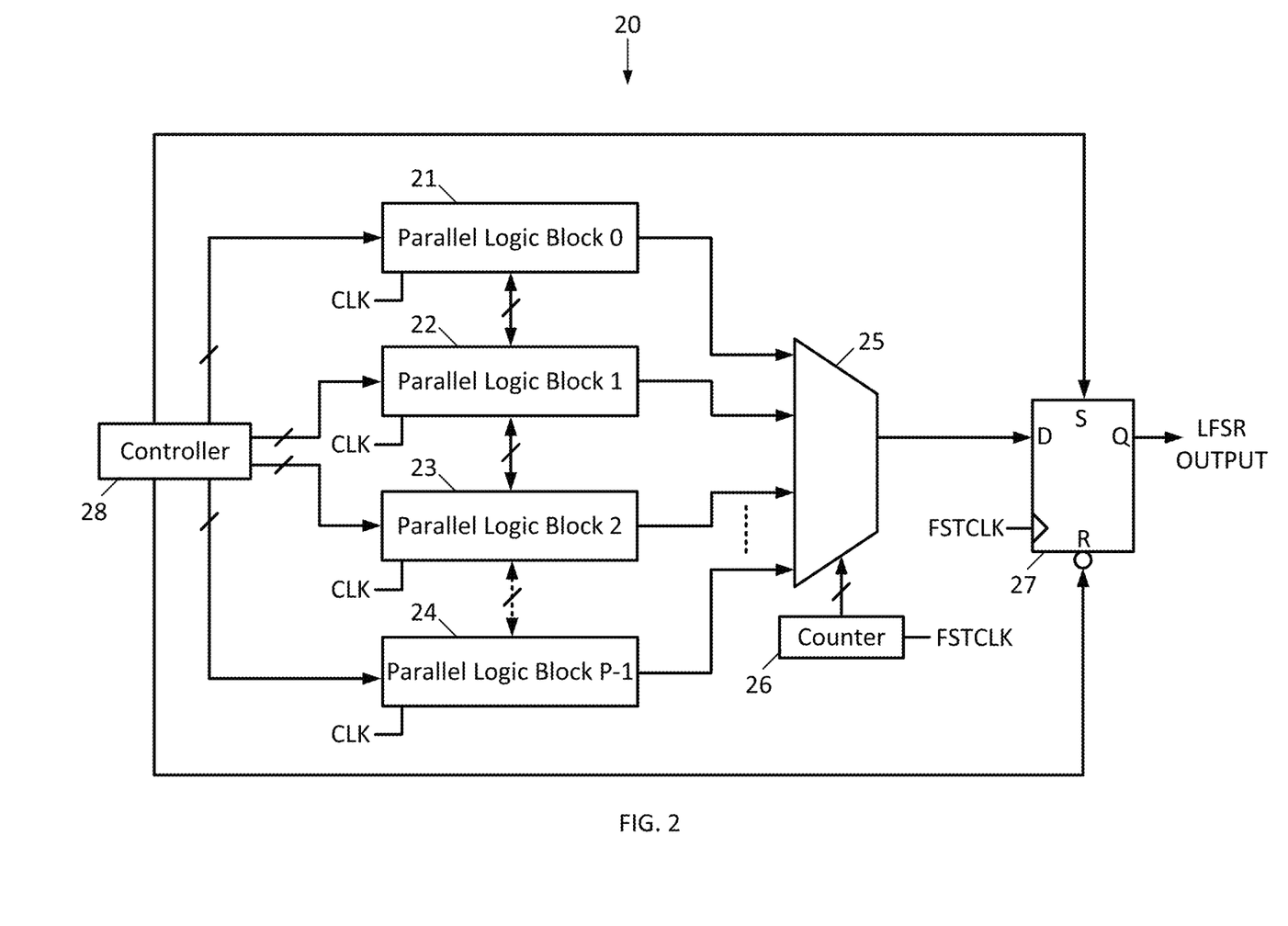
FIG. 2 is a block diagram of a LFSR described herein.

Referring initially to FIG. 2, a linear feedback shift register (LFSR) 20 is disclosed herein. The LFSR 20 is an N-bit LFSR comprised of parallel logic blocks 21-24 that, through a multiplexer 25, provide output to an output flip flop 27. The output flip flop 27 is clocked by a fast or high speed clock FSTCLK, and the parallel logic blocks 21-24 are each comprised of flip flop chains clocked by a slow clock CLK, the slow clock being equal to the fast clock FSTCLK divided by a divisor P. The specific frequencies of FSTCLK and CLK are dependent upon the technology used in the LFSR design.

With the numbers N and P now being understood, in greater detail, the LFSR 20 includes P parallel logic blocks (illustrated as parallel logic blocks 21-24, referred to as Parallel Logic Blocks 0 to P−1, with it being understood that there may be any number P of parallel logic blocks), having interconnections with each other, and each providing output to the multiplexer 25. As explained, each parallel logic block 21-24 is comprised of a chain of flip flops clocked by the slow clock CLK. The multiplexer 25 has a selection input that receives input from a counter 26 clocked by the high speed clock FSTCLK. The counter 26 counts from 0 to P−1, provides its output at each increment to the selection input of the multiplexer 25, and overflows (thereby effectively resetting) once its count reaches P−1. The output of the multiplexer 25 is fed to the input of a flip flop 27, which as stated above is clocked by the high speed clock FSTCLK to provide as output a LFSR output stream of bits. Note that a controller 28 generates set and reset signals for the flip flop 27, as well as all flip flops within the parallel logic blocks 21-24.

Figure 3:
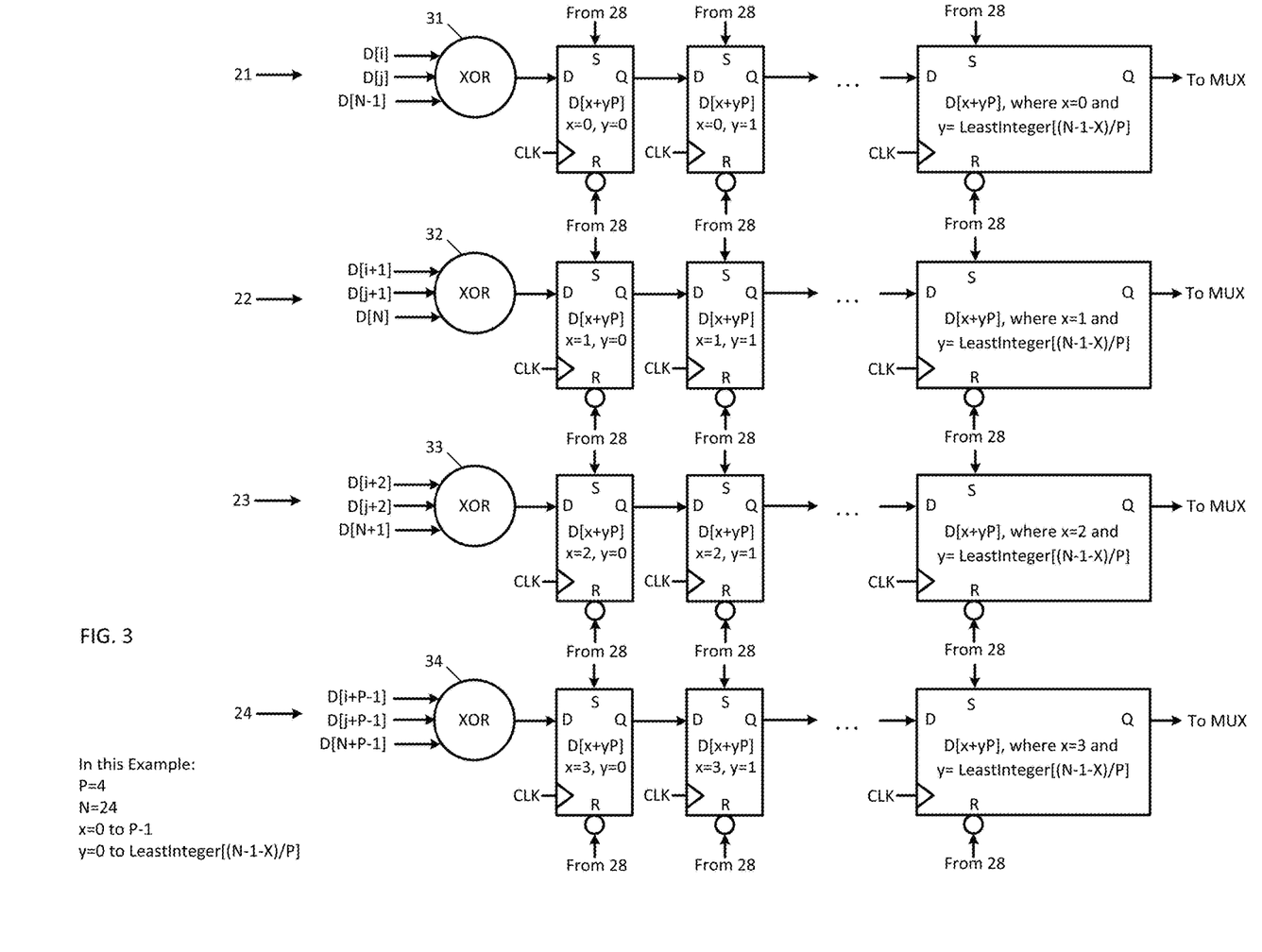
FIG. 3 is a generalized schematic block diagram illustrating the parallel logic blocks of FIG. 2.

The structure of the parallel logic blocks 21-24 is now described with additional reference to FIG. 3. Each of the parallel logic blocks 21-24 includes a plurality of flip flops connected in a chain and indexed according to the expression D [x+yP], where x represents which parallel logic block an individual flip flop belongs to (so, x=0 indicates that a flip flop belongs to the parallel logic block 21; x=1 indicates that the flip flop belongs to the parallel logic block 22, and so on and so forth), where y indicates the position of an individual flip flop within its respective parallel logic block (so, y=0 indicates that a flip flop is the first in its parallel logic block; y=1 indicates that a flip flop is the second in its parallel logic block, and so on and so forth), and where P indicates the divisor applied to the high speed clock FSTCLK.

Note, however, that the last flip flop of each parallel logic block has a y value equal to the smallest integer greater than or equal to (N−1−x)/P, keeping in mind that N represents the number of bits of the LFSR 20. Mathematically, this is known as a least integer function, so y for the last flip flop in each parallel logic block can be mathematically represented as:

$$y = LeastInteger\left[\frac{N-1-x}{P}\right] \quad (1)$$

Mathematically, this equation can be derived from the fact that the y value of the last flip flop in each parallel logic block is to be greater than or equal to N−1. Thus, we can derive the above equation as follows:

$$x+yP \geq N-1 \quad (2)$$

Rearranging this equation yields:

$$y \geq \frac{N-1-x}{P} \quad (3)$$

Since y is to be an integer, the least integer function is used, yielding the equation (1) described above.

The input to each first flip flop of each parallel logic block 21-24 is the output of a respective exclusive OR circuit 31-34. The inputs to each exclusive OR circuit 31-34 are as now described.

The inputs to the exclusive OR circuit 31 of the parallel logic block 21 are the exponents of a primitive polynomial of order N−1. Primitive polynomials are known to those of ordinary skill in the art, and therefore need not be described in detail here, as one of ordinary skill in the art can calculate a primitive polynomial of any order. To keep this example generic, assume that the exponents to the primitive polynomial of order N−1 are i, j, and N−1. Therefore, the inputs to the exclusive OR circuit 31 are the outputs of the flip flops D [N−1], D [i], and D [j], keeping in mind that the index (the number within the brackets after D) is calculated as described above. Therefore, whichever flip flops have indexes calculated to equal N−1, i, and j provide output to the input of the exclusive OR circuit 31. These flip flops with the noted indexes can exist in any of the parallel logic blocks 21-24.

For each successive parallel logic block, the indexes calculated for the immediately preceding parallel logic block are incremented by one. Therefore, since the indexes calculated for the inputs to the exclusive OR circuit 31 are N−1, i, and j, the indexes for inputs to the exclusive OR circuit 32 are N, i+1, and j+1. Therefore, the outputs of the flip flops D [N], D [i+1], and D [j+1] are the inputs to the exclusive OR circuit 32.

Continuing with this, since the indexes calculated for inputs to the exclusive OR circuit 32 are N, i+1, and j+1, the indexes for the inputs to the exclusive OR circuit 33 are N+1, i+2, and j+2. Therefore, the outputs of the flip flops D [N+1], D [i+2], and D [j+2] are the inputs to the exclusive OR circuit 33.

Similarly, since the indexes calculated for inputs to the exclusive OR circuit 33 are N+1, i+2, and j+2, the indexes for the inputs to the exclusive OR circuit 34 are N+P−1 (since the last parallel logic block is the P−1th logic parallel logic block), i+P−1, and j+P−1. Therefore, the outputs of the flip flops D [N+P−1], D [i+P−1], and D [j+P−1] are the inputs to the exclusive OR circuit 34.

Those of ordinary skill in the art will understand that there may be multiple primitive polynomials of any given order N−1. This means that for a LFSR 20 having a given number of bits N, there may be multiple possible different combinations of inputs that may be provided to the P exclusive OR circuits.

Figure 4:
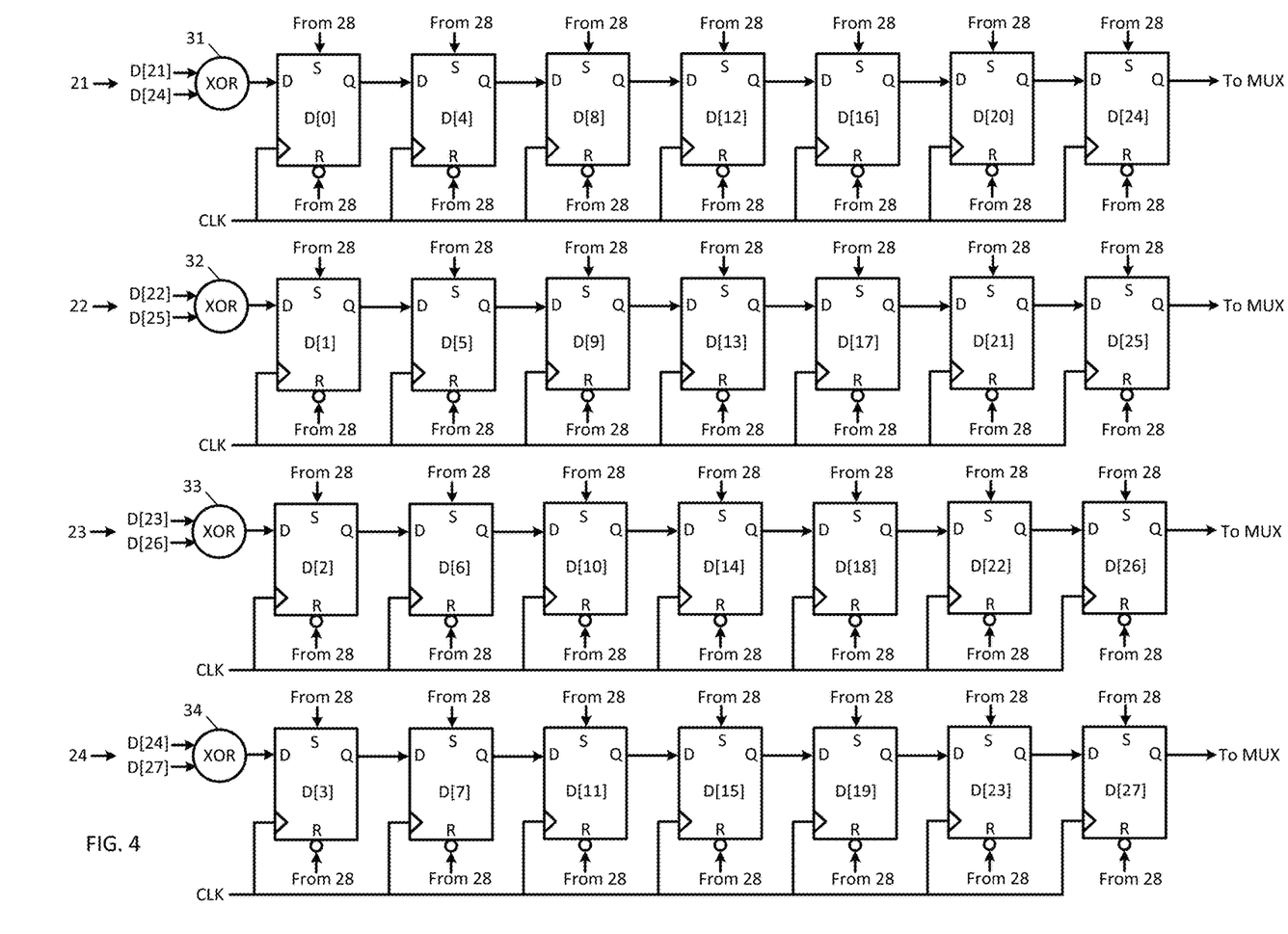
FIG. 4 is a schematic block diagram illustrating a specific example of the parallel logic blocks of FIG. 2.

One example is shown in FIG. 4. Here, N=25 and P=4. Therefore: the first parallel logic block 21 has the flip flops D [0], D [4], D [8], D [12], D [16], D [20], and D [24]; the second parallel logic block 22 has the flip flops D [1], D [5], D [9], D [13], D [17], D [21], and D [25]; the third parallel logic block 23 has the flip flops D [2], D [6], D [10], D [14], D [18], D [22], and D [26]; and the fourth parallel logic block 24 has the flip flops D [3], D [7], D [11], D [15], D [19], D [23], and D [27]. The primitive polynomial of order 24 used here has exponents of 24 and 21. Therefore: the inputs to the exclusive OR circuit 31 are the outputs of D [21] and D [24]; the inputs to the exclusive OR circuit 32 are the outputs of D [22] and D [25]; the inputs to the exclusive OR circuit 33 are the outputs of D [23] and D [26]; and the inputs to the exclusive OR circuit 34 are the outputs of D [24] and D [27].

Start states for the LFSR 20 will now be described. At the start of operation, the controller 28 may reset each flip flop of each parallel logic block by asserting the reset signal (which may be a logic low signal) to those flip flops, with the exception of one flip flop of each parallel logic block which the controller 28 sets. Which flip flop of each parallel logic block is set may change from iteration to iteration, with the setting of different flip flops resulting in different LFSR output words. In some instances, at the start of operation, the controller 28 may reset each flip flop of each parallel logic block by asserting the reset signal to those flip flops, with the exception of two or more flip flops of each parallel logic block which the controller sets 28. Which flip flops of each parallel logic block are set may change from iteration to iteration, with the setting of different flip flops resulting in different LFSR output words.

Figure 5:
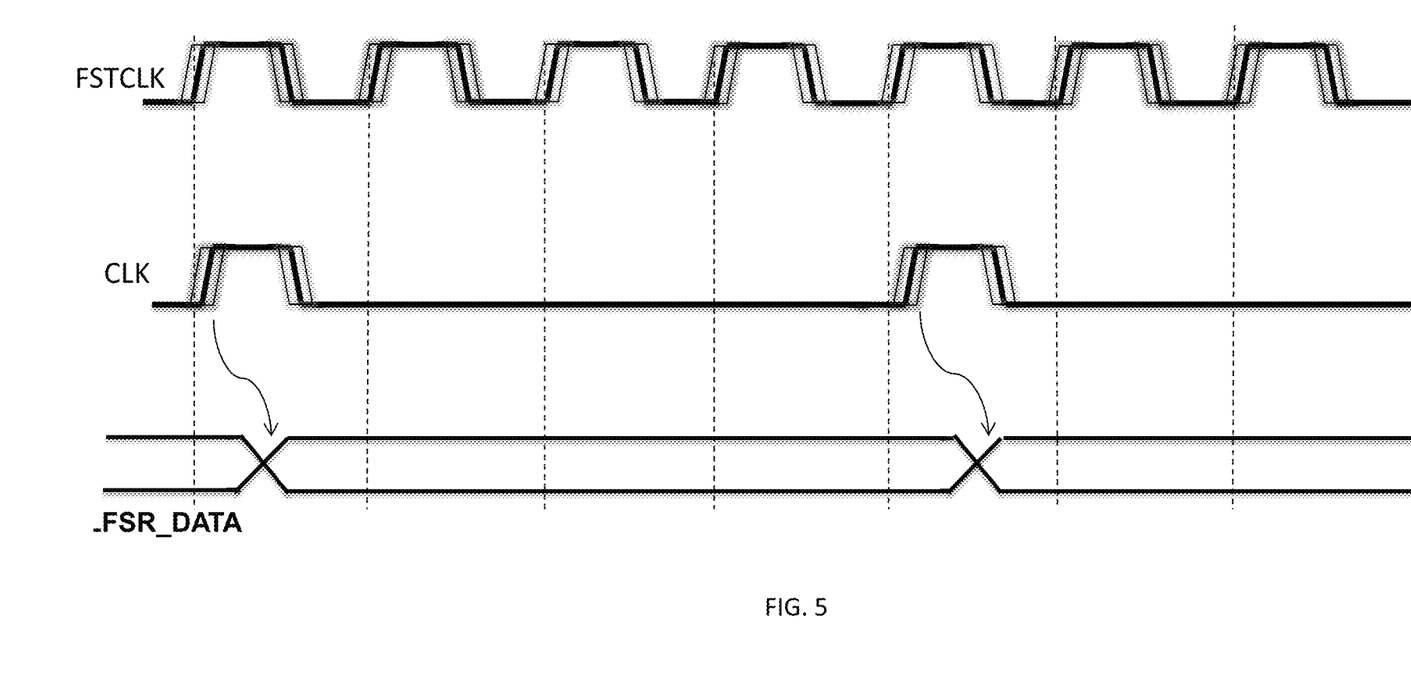
FIG. 5 is a graph showing the relation between the high speed clock FSTCLK and the low speed clock CLK.

As stated, the slow clock CLK is a version of the high speed clock FSTCLK divided by P. This can be seen in FIG. 5 where P=4, where it can also be observed that completion of output of an N-bit LFSR output word occurs at each rising edge of the slow CLK (as different sub-words of the LFSR output word are output at each rising edge of the high speed clock FSTCLK).

Figure 6:
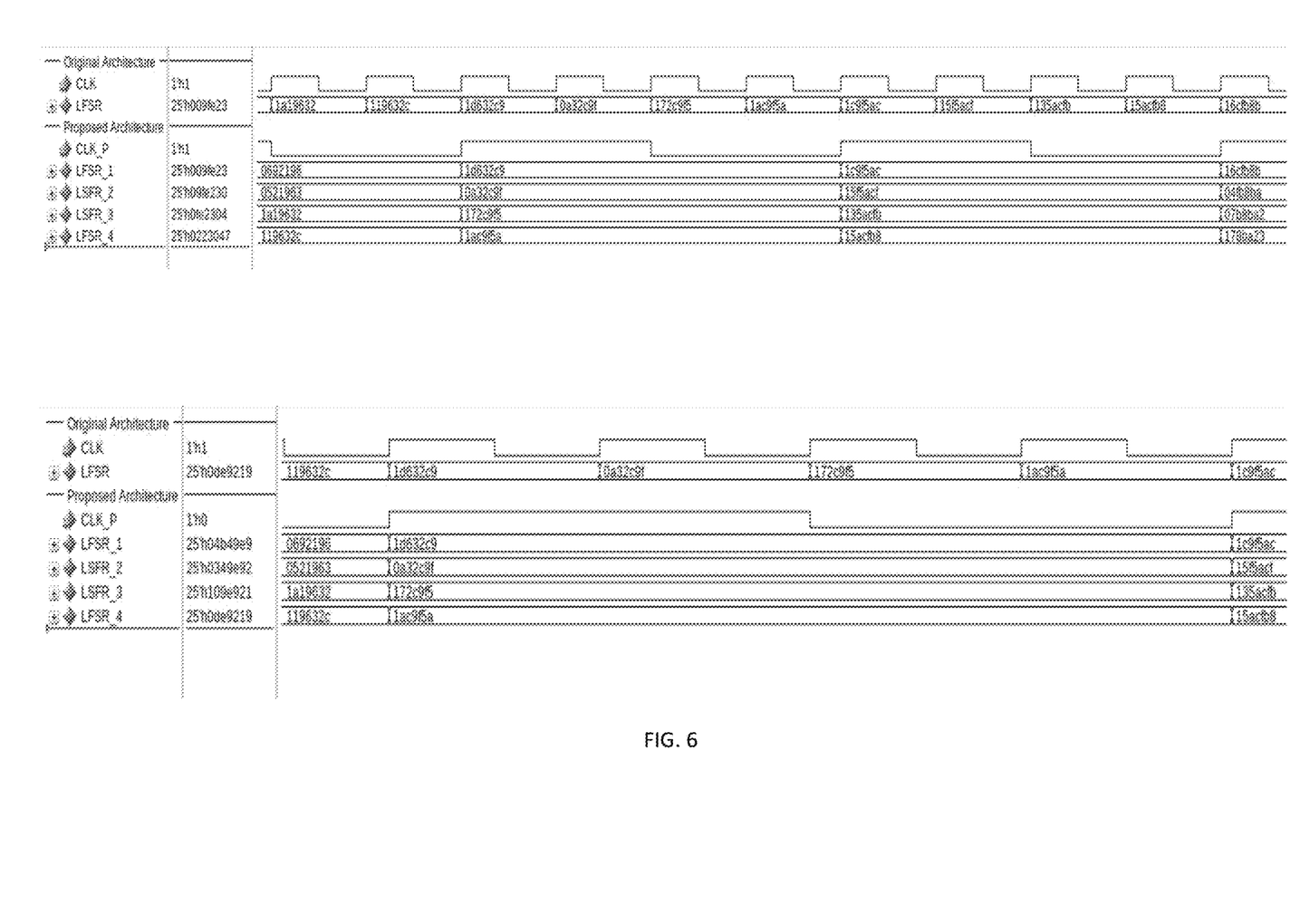
FIG. 6 is a graph comparing the output of the LFSR of FIG. 2 to the LFSR of FIG. 1, given the same input conditions.

Sample outputs showing that the N-bit LFSR output words produced by the LFSR 20 of FIG. 2 are the same as the N-bit LDSR output words produced by the LFSR 10 of FIG. 1, given the same input states to the parallel logic blocks, may be seen in FIG. 6. Observe, in the top graph, how when the LFSR output values are produced using the high speed clock FSTCLK to operate the flip flops (embodiment of FIG. 1), the first four LFSR output values produced are 105D7C4, 01D7C49, 1D7C490, and 0BC490F; now, observe directly below it that those very same values are produced when operating the flip flops (embodiment of FIG. 2) using the low speed clock CLK. The difference is that with the embodiment of FIG. 1, a LFSR output value is produced at each rising edge of the high speed clock FSTCLK, while with the embodiment of FIG. 2, four LFSR output values are produced in parallel at each rising edge of the low speed clock CLK. Thus, the embodiment of FIG. 2 could be considered to have the same throughput as the embodiment of FIG. 1, except for the fact that the embodiment of FIG. 2 can be run with the high speed clock FSTCLK at a higher frequency than is possible for the embodiment of FIG. 1 without the embodiment of FIG. 1 operating erroneously. Thus, the LFSR 20 of FIG. 2 is actually capable of higher throughput than the LFSR 10 of FIG. 1.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An N-bit linear feedback shift register (LFSR), comprising:
    a number P of parallel chains of flip flops each having an output;
    a counter circuit clocked by a first clock and configured to output N different output words, with a different one of the N different output words being produced at each pulse of the first clock, and configured to reset once each of the N different output words has been output;
    a multiplexer having a singular output, and having inputs coupled to the outputs of the P parallel chains of flip flops, having a selection input coupled to the counter circuit to receive the N different output words from the counter circuit, and configured to pass a different input to the singular output dependent upon which of the N different output words is received from the counter circuit; and
    a flip flop having an input coupled to the singular output of the multiplexer and being clocked by the first clock such that the flip flop passes a current state of its input to its output upon each pulse of the first clock;
    wherein each parallel chain of flip flops comprises:

a chain of flip flops clocked by a second clock, the second clock being equal to the first clock divided by P, each flip flop of that chain except a last flip flop of that chain having an index calculated as x+yP, where x represents which of the P parallel chains of flip flops that the chain of flip flops belongs to, and where y represents a position within the chain of flip flops occupied by that flip flop, wherein the last flip flop of that chain has an index calculated as x+yP where y is equal to a smallest integer greater than or equal to (N−1−x)/P; and a combinational logic circuit for that parallel chain of flips receiving, as input, output from those flip flops of the chain of flip flops for that parallel chain of flip flops having an index equal to an exponent of a primitive polynomial of order N−1, wherein the combinational logic circuit for that parallel chain of flip flops provides its output as input to a first of the chain of flip flops for that parallel chain of flip flops.

2. The N-bit LFSR of claim 1, further comprising a controller configured to, in a startup mode, reset all but one flip flop of each of the parallel chains of flip flops, and set the but one flip flop of each of the parallel chains of flip flops that was not reset.

3. The N-bit LFSR of claim 1, wherein the combinational logic circuit comprises an exclusive-OR (XOR) logic circuit.

4. An N-bit linear feedback shift register (LFSR), comprising:
a number P of parallel chains of flip flops each having an output, wherein each parallel chain of flip flops comprises:
a chain of flip flops clocked by a second clock, the second clock being equal to a first clock divided by P, each flip flop of that chain except a last flip flop of that chain having an index calculated as x+yP, where x represents which of the P parallel chains of flip flops that the chain of flip flops belongs to, and where y represents a position within the chain of flip flops occupied by that flip flop, wherein the last flip flop of that chain has an index calculated as x+yP where y is equal to a smallest integer greater than or equal to (N−1−x)/P; and
an exclusive-OR (XOR) circuit for that parallel chain of flips receiving, as input, output from those flip flops of the chain of flip flops for that parallel chain of flip flops having an index equal to an exponent of a primitive polynomial of order N−1, wherein the XOR circuit for that parallel chain of flip flops provides its output as input to a first of the chain of flip flops for that parallel chain of flip flops;
wherein, at each rising edge of the second clock, P LFSR outputs are respectively produced from outputs of last flip flops of each of the chains of flip flops of the P parallel chains of flip flops.

5. The N-bit LFSR of claim 4, further comprising a controller configured to, in a startup mode, reset all but one flip flop of each of the parallel chains of flip flops, but set the one flip flop of each of the parallel chains of flip flops that was not reset.

6. The N-bit LFSR of claim 4, further comprising a multiplexer having a singular output, and having inputs coupled to outputs of the P parallel chains of flip flops, and configured to pass a different input to the singular output dependent upon which of N different output words is received at a selection input of the multiplexer.

7. The N-bit LFSR of claim 6, further comprising a flip flop having an input coupled to the singular output of the multiplexer and being clocked by the first clock such that the flip flop passes a current state of its input to its output upon each pulse of the first clock.

8. The N-bit LFSR of claim 6, further comprising a counter circuit clocked by the first clock and configured to output the N different output words, with a different one of the N different output words being produced at each pulse of the first clock, and configured to reset once each of the N different output words has been output.

9. An N-bit linear feedback shift register (LFSR), comprising:
a number P of parallel chains of flip flops each having an input and an output, wherein the input is coupled to an output of a combinational logic circuit for that parallel chain of flip flops, wherein inputs of the combinational logic circuit for that parallel chain of flip flops are coupled to outputs of different flip flops of the P parallel chains of flip flops according to exponents of a primitive polynomial of order N−1, wherein the flip flops of the P parallel chains of flip flops are clocked by a second clock;
wherein, at each rising edge of the second clock, P LFSR outputs are respectively produced from the outputs of last flip flops of each of P parallel chains of flip flops; and
a controller configured to, in a startup mode, reset all but one flip flop of each of the parallel chains of flip flops, but set the one flip flop of each of the parallel chains of flip flops that was not reset.

10. The N-bit LFSR of claim 9, further comprising a multiplexer having a singular output, and having inputs coupled to the outputs of the P parallel chains of flip flops, and configured to pass a different input to the singular output dependent upon which of N different output words is received at a selection input of the multiplexer.

11. The N-bit LFSR of claim 10, further comprising a counter circuit clocked by a first clock and configured to output the N different output words, with a different one of the N different output words being produced at each pulse of the first clock, and configured to reset once each of the N different output words has been output.

12. The N-bit LFSR of claim 9, wherein the combinational logic circuit comprises an exclusive-OR (XOR) circuit.

13. An N-bit linear feedback shift register (LFSR), comprising: of claim 10, further comprising a number P of parallel chains of flip flops each having an input and an output, wherein the input is coupled to an output of a combinational logic circuit for that parallel chain of flip flops, wherein inputs of the combinational logic circuit for that parallel chain of flip flops are coupled to outputs of different flip flops of the P parallel chains of flip flops according to exponents of a primitive polynomial of order N−1, wherein the flip flops of the P parallel chains of flip flops are clocked by a second clock;
wherein, at each rising edge of the second clock, P LFSR outputs are respectively produced from the outputs of last flip flops of each of P parallel chains of flip flops;
a multiplexer having a singular output, and having inputs coupled to the outputs of the P parallel chains of flip flops, and configured to pass a different input to the singular output dependent upon which of N different output words is received at a selection input of the multiplexer; and
a flip flop having an input coupled to the singular output of the multiplexer and being clocked by a first clock such that the flip flop passes a current state of its input to its output upon each pulse of the first clock, wherein the first clock has a frequency that is P times a frequency of the second clock.

14. The N-bit LFSR of claim 13, further comprising a controller configured to, in a startup mode, reset all but one flip flop of each of the parallel chains of flip flops, but set the one flip flop of each of the parallel chains of flip flops that was not reset.

15. An N-bit linear feedback shift register (LFSR), comprising:
a number P of parallel chains of flip flops each having an output;
a counter circuit clocked by a first clock and configured to output N different output words, with a different one of the N different output words being produced at each pulse of the first clock, and configured to reset once each of the N different output words has been output;
a multiplexer having a singular output, and having inputs coupled to the outputs of the P parallel chains of flip flops, having a selection input coupled to the counter circuit to receive the N different output words from the counter circuit, and configured to pass a different input to the singular output dependent upon which of the N different output words is received from the counter circuit; and
a flip flop having an input coupled to the singular output of the multiplexer and being clocked by the first clock such that the flip flop passes a current state of its input to its output upon each pulse of the first clock;
wherein each parallel chain of flip flops comprises:
a chain of flip flops clocked by a second clock, the second clock being equal to the first clock divided by P; and
a combinational logic circuit for that parallel chain of flip flops receiving, as input, output from selected flip flops of the chains of flip flops of others of the P parallel chains of flip flops, wherein the combinational logic circuit for that parallel chain of flip flops provides its output as input to a first of the chain of flip flops for that parallel chain of flip flops.

16. The N-bit LFSR of claim 15, wherein the combinational logic circuit comprises an exclusive-OR (XOR) circuit.

17. The N-bit LFSR of claim 15, further comprising a controller configured to, in a startup mode, reset all but one flip flop of each of the parallel chains of flip flops, and set the but one flip flop of each of the parallel chains of flip flops that was not reset.

18. A linear feedback shift register (LFSR), comprising:
a number of parallel chains of flip flops each having an input and an output, wherein the input is coupled to an output of a combinational logic circuit for that parallel chain of flip flops, wherein inputs of the combinational logic circuit for that parallel chain of flip flops are coupled to outputs of different flip flops of the parallel chains of flip flops according to exponents of a primitive polynomial, wherein the flip flops of the parallel chains of flip flops are clocked by a second clock;
wherein, at each rising edge of the second clock, LFSR outputs are respectively produced from the outputs of last flip flops of each of the parallel chains of flip flops; and
a controller configured to, in a startup mode, reset all but one flip flop of each of the parallel chains of flip flops, but set the one flip flop of each of the parallel chains of flip flops that was not reset.

19. The LFSR of claim 18, further comprising a multiplexer having a singular output, and having inputs coupled to the outputs of the parallel chains of flip flops, and configured to pass a different input to the singular output dependent upon which of different output words is received at a selection input of the multiplexer.

20. The LFSR of claim 19, further comprising a counter circuit clocked by a first clock and configured to output the different output words, with a different one of the different output words being produced at each pulse of the first clock, and configured to reset once each of the different output words has been output.

21. The LFSR of claim 18, wherein the combinational logic circuit comprises an exclusive-OR (XOR) circuit.

22. A linear feedback shift register (LFSR) comprising:
a number of parallel chains of flip flops each having an input and an output, wherein the input is coupled to an output of a combinational logic circuit for that parallel chain of flip flops, wherein inputs of the combinational logic circuit for that parallel chain of flip flops are coupled to outputs of different flip flops of the parallel chains of flip flops according to exponents of a primitive polynomial, wherein the flip flops of the parallel chains of flip flops are clocked by a second clock;
wherein, at each rising edge of the second clock, LFSR outputs are respectively produced from the outputs of last flip flops of each of the parallel chains of flip flops;
a multiplexer having a singular output, and having inputs coupled to the outputs of the parallel chains of flip flops, and configured to pass a different input to the singular output dependent upon which of different output words is received at a selection input of the multiplexer; and
a flip flop having an input coupled to the singular output of the multiplexer and being clocked by a first clock such that the flip flop passes a current state of its input to its output upon each pulse of the first clock, wherein the first clock has a frequency that is a multiple of a frequency of the second clock.

23. The LFSR of claim 22, wherein the combinational logic circuit comprises an exclusive-OR (XOR) circuit.

* * * * *